United States Patent [19]

Takamizawa

[11] Patent Number: 5,655,536
[45] Date of Patent: Aug. 12, 1997

[54] DIAGNOSTIC ULTRASOUND IMAGING USING TWO-DIMENSIONAL TRANSDUCER ARRAY PROBE

[75] Inventor: Kinya Takamizawa, Utsunomiya, Japan

[73] Assignee: Kabushiki Kaisha Toshiba, Kawasaki, Japan

[21] Appl. No.: 668,184

[22] Filed: Jun. 21, 1996

[30] Foreign Application Priority Data

Jun. 22, 1995 [JP] Japan .................... 7-155661

[51] Int. Cl.⁶ ............................................ A61B 8/00
[52] U.S. Cl. ........................................ 128/661.01
[58] Field of Search ................... 128/660.07, 660.08,
128/661.01, 661.08, 661.09, 660.05, 661.1,
662.01, 662.03; 73/625, 626, 861.25

[56] References Cited

U.S. PATENT DOCUMENTS 4,542,746  9/1985  Takamizawa .
5,186,175  2/1993  Hirama et al. .
5,329,496  7/1994  Smith ................... 128/662.03
5,579,768  12/1996  Klesenski ................ 128/660.06

*Primary Examiner*—George Manuel
*Attorney, Agent, or Firm*—Oblon, Spivak, McClelland, Maier & Neustadt, P.C.

[57] ABSTRACT

A diagnostic ultrasound system capable of electronically controlling a beam width not only in a scan direction but also in a slice direction orthogonal to the scan direction despite a relatively small circuit scale. The system is provided with an ultrasonic probe having a plurality of ultrasonic transducers arranged two-dimensionally, and a transmitting/receiving unit for use in scanning an ultrasonic beam, which is transmitted and received by selectively driving the ultrasonic transducers, in the scan direction, and focusing the ultrasonic beam in the slice direction. A driving signal is supplied in common to a plurality of transducers elements adjoining in the slice direction. An echo signal converted by transducers is not only subjected to control of a specified delay time in the scan direction but also received in time sequence and then subjected to control of at least a specified delay time in the slice direction. The echo signal thus-processed is produced into an ultrasound image.

27 Claims, 9 Drawing Sheets

DIAGNOSTIC ULTRASOUND IMAGING USING TWO-DIMENSIONAL TRANSDUCER ARRAY PROBE

BACKGROUND OF THE INVENTION

1. Field of the Invention

The present invention relates to an ultrasonic probe made by arranging in two dimensions a plurality of electroacoustic transducing elements and to a diagnostic ultrasound system that uses the transducing elements for imaging. More particularly, this invention is concerned with a diagnostic ultrasound system capable of electronically controlling the beam width of an ultrasonic beam even in a slice direction orthogonal to a scan direction.

2. Description of the Related Art

The modality of diagnostic ultrasound, in which ultrasonic pulses are irradiated into a body and waves reflected from each tissue are used to acquire biomedical information, has the advantage of no possibility of causing an exposure-related injury unlike X-rays and a possibility of diagnosing a soft tissue without the use of a contrast medium.

In an ultrasonic probe used for a currently most prevailing system of an electronic scanning type, a plurality of electroacoustic transducing elements (hereinafter transducers) are generally arranged one-dimensionally, and controlled and driven mutually independently in order to change a transmission or reception direction of ultrasonic waves at a high speed and thus enable real-time production of tomographic images of a living body.

FIG. 1 shows a structure of an ultrasonic probe having transducers arranged one-dimensionally. In other words, the ultrasonic probe has a plurality of transducers 1 arranged one-dimensionally in a direction in which ultrasonic waves are scanned.

As shown in FIG. 1, each transducer 1 has an electrode 29 on a medium side thereof (living body side) through which an ultrasonic wave is transmitted or received and on an opposite side thereof (system side). The electrodes 29 on the system side are connected to signal lines 30, while the electrodes 29 on the living body side have the front sides thereof connected to an impedance matching layer 31. The impedance matching layer 31 adjusts a difference (a product of a density and sound velocity) in acoustic impedance between the living body and transducers 1, and enables ultrasonic pulses having a few waves to enter the living body efficiently.

Furthermore, an acoustic lens 32 made of a silicon rubber or the like is affixed to the impedance matching layer 31. The acoustic lens 32 fills the role of focusing an ultrasonic beam at a given distance in a slice direction orthogonal to a scan direction. Moreover, a back load member (backing) 33 is affixed to the electrodes 29 on the system side. The back load member 33 is designed to absorb unwanted ultrasonic waves irradiated in a direction opposite to a living body, and also fills the role of a support for the transducers 1.

Next, the principles of an (linear) electronic scanning type diagnostic ultrasound system having a thus-configured ultrasonic probe are shown in FIG. 2. Electronic switches 2 mounted on a main unit of the system are connected to the M transducers 1, which are arranged one-dimensionally in the probe, by way of signal lines. In the main unit of the system, the electronic switches 2 are connected to a transmitter 4 and receiver 5. Moreover, an output of the receiver 5 is displayed as an ultrasonic tomographic image on a TV monitor 6. In the linear electronic scanning type system, during one cycle of receiving ultrasonic wave, m adjoining transducers 1 of the M transducers 1 are driven simultaneously. The m transducers are shifted one by one at every transmission or reception.

Talking of each transmission wave or received wave, first, a reference pulse output from the transmitter 4 is sent to a delay circuit 3 that introduces a delay time necessary to focus an ultrasonic beam. Focusing an ultrasonic beam is intended to improve the resolution of an ultrasonic image. Transmission pulses lagging by different delay times are applied as driving signals to the m adjoining transducers 1 selected by the electronic switches 2. The m transducers 1 then irradiate ultrasonic waves to a medium. By contrast, reflected signals of ultrasonic waves emanating from a living tissue are received by the m transducers 1.

Received signals are then sent to the delay circuit 3 via the electronic switches 2, delayed by substantially the same delay times as the previous ones, and then synthesized. The resultant signals are subjected to amplitude compression or envelope detection within the receiver 5. After being converted from an analog form to digital form, the signals are stored temporarily in an image memory. One image produced by repeating this kind of operation while shifting m transducers one by one is converted according to a standard TV format and displayed on the TV monitor 6.

When an ultrasonic probe having the aforesaid transducers arranged one-dimensionally is employed, it is possible to focus an ultrasonic beam in an arrangement (scan) direction of transducers by controlling delay times electronically; that is, using a delay circuit. A movement of a focal point in an irradiation direction (depth direction of a living body) can be made rapidly. In other words, it is possible to scan an ultrasonic beam with its small width retained in the depth direction owing to fast control of delay times.

By contrast, as far as the slice direction is concerned, as already mentioned, since beam focusing using an acoustic lens is adopted, the radius of curvature of the acoustic lens is fixed, and a focal point is also fixed at one position. It is therefore impossible to keep a beam width small in a wide range in the depth direction. A two-dimensional array probe is available as a means for solving this problem.

Now, a transducer driving method to be adopted when the number (n) of transducers lying in the slice direction is 8 will be described. FIG. 3 shows the basic driving method. As already described, for focusing an ultrasonic beam, signals sent from transducers of a group of transducers which are located at symmetric positions with respect to the center are delayed by the same delay time.

Any problem therefore does not occur even when the transducers 1 are interconnected as illustrated in advance. This method halves the scale of subsequent electronic circuits. In a probe, the transducers I and preamplifiers 10 are connected unitedly. The two-dimensional array of transducers 1 needs a smaller area per element than conventional transducers. This leads to a high impedance of an element, whereby it becomes hard to attain a sufficient signal-to-noise ratio.

It is therefore preferable to place the preamplifiers 10 closely to the transducers 1. That is to say, the transducers 1 and preamplifiers 10 are incorporated in an ultrasonic probe, and then connected to a receiving circuit in the main unit of a system by way of cables with the impedances of the transducers reduced sufficiently. On a transmitting side, driving pulses used to drive the transducers I are sent from the main unit by way of the same cables. However, the driving pulses bypass the preamplifiers 10, and then are sent to the transducers in order to drive the transducers.

FIG. 3 also shows in detail a single buffer preamplifier AMP. The preamplifier AMP has high-voltage protecting circuits 11-A and 11-B on its input and output stages thereof. A diode circuit 9 is placed in parallel to these circuits. Namely, impulses each having a peak value ranging from 100 to 200 volts are sent from the main unit to the probe by way of the cables during transmission. The driving pulses are sent to the transducers 1 via the diode circuits in order to drive the transducers for generation of ultrasonic waves. At this time, the preamplifiers 10 can avoid a high-voltage breakdown owing to the protecting circuits 11A and protecting circuits 11B each of which includes a diode and the like.

By contrast, during reception, received signals received by the transducers are input to the preamplifiers 10 via the protecting circuits 11-A. After amplified by a given quantity, the signals are output against a low output impedance onto the cables via the protecting circuits 11-B, and then sent to the receiving circuit in the main unit. At this time, the received signals are signals having a small amplitude of one volt or less and therefore cut off by the diode circuits 9. Using the foregoing circuitry, if preamplifiers are inserted into a maximum four channels, a two-dimensional array transmitting/receiving circuit having 8 channels in the slice direction can be realized.

In a two-dimensional array probe, when, for example, m transducers and n transducers are arranged in a scan direction and slice direction respectively, unless any measure is taken, the number of channels of a transmitting/receiving circuit increases with an increase in number of transducers. Consequently, a system having an extremely large-scale transmitting/receiving circuit becomes necessary. This is not practical. Moreover, even if the circuitry shown in FIG. 3 is employed, the number of cables is as many as four times larger than that attained when a conventional one-dimensional array probe is adopted. This poses a problem that the probe becomes heavy and hard to handle.

SUMMARY OF THE INVENTION

The present invention attempts to solve the forgoing problem. An object of the present invention is to provide a diagnostic ultrasound system capable of electronically controlling a beam width not only in a scan direction but also in a slice direction orthogonal to the scan direction despite a relatively small circuit scale.

Another object of the invention is to provide a diagnostic ultrasound imaging which is able to selectively provide a B-mode image by controlling an ultrasound beam width not only in a scan direction but also in a slice direction despite a relatively small circuit scale, or a Doppler-mode image in which more emphasis is put on real time than on the shape of an ultrasound beam.

In order to accomplish the objects, according to one aspect of the invention, there is a diagnostic ultrasound system by which an ultrasound beam is scanned within an object to be examined to receive an ultrasound echo produced by reflection of the ultrasound beam, the ultrasound echo being processed into an image of the object, the system comprising: an ultrasound probe having a two-dimensional array of transducers in which a plurality of transducers are two-dimensionally disposed in both a first and a second direction perpendicular to each other; an element for transmitting the ultrasound beam toward the object by driving the transducers in a manner that a driving signal having a specified delay time given to focus in the first direction is supplied to at least specified ones of the transducers, the driving signal being supplied almost simultaneously to each column of transducers disposed in the second direction; an element for receiving the ultrasound echo by processing an echo signal outputted from the at least specified ones of the transducers correspondingly to reception of the ultrasound echo in a manner that the echo signal is not only subjected to control of a specified delay time in the first direction but also received in time sequence and then subjected to control of at least one of a specified delay time and a specified weighting factor in the second direction; and an element for producing the ultrasound image using the processed echo signal.

For example, the first direction is a scan direction of the ultrasound beam and the second direction is a slice direction sliced by the ultrasound beam.

The ultrasound probe can be formed with an acoustic lens through which the ultrasound beam and the ultrasound echo are transmitted from and to the transducers and are beam-formed in the slice direction.

It is preferred that the receiving element comprises a weighting circuitry for applying the weighting coefficient to the echo signal according to an aperture control of the two-dimensional array.

It is also preferred that the transmitting element includes a transmission circuit for supplying the driving signal in common to each column of the transducers disposed in the slice direction. Preferably, the transmission circuit includes, for each column of the transducers disposed in the slice direction, a transmission branch circuit connected to each transducer residing in each column of the transducers, a signal line of which one end is connected to the branch circuit, and a driving circuit connected to the other end of the signal line. Still preferably, the driving circuit includes an element providing the driving signal the specified delay time given to the scan in the scan direction.

It is preferred that the receiving element includes a reception circuit for receiving the echo signal in a selective manner of every transducer residing in each column of the transducers disposed in the slice direction. Preferably, the reception circuit includes, for each column of the transducers disposed in the slice direction, a reception branch circuit connected to each transducer residing in each column of the transducers, a signal line of which one end is connected to the branch circuit, and a signal processing circuit connected to the other end of the signal line.

Preferably, the transducers disposed in the second direction are even in number and each pair of the transducers disposed in each column of the array are electrically connected to each other and arranged in parallel with a combination of each of the transmission circuits and each of the reception circuit, each pair of the transducers consisting of two transducers symmetrically positioned with regard to a center in the slice direction of the array.

Still preferably, in each of the transmission circuits, the transmission branch circuit is divided into two, each of which is connected to the signal line and in each of said reception circuits, the reception branch circuit is connected to the signal line used in common with the transmission branch circuit.

According to another aspect of the present invention, diagnostic ultrasound system by which an ultrasound beam is scanned within an object to be examined to receive an ultrasound echo produced by reflection of the ultrasound beam, the ultrasound echo being processed into an image of the object, the system comprising: an ultrasound probe having a two-dimensional array of transducers in which a plurality of transducers are two-dimensionally disposed in both a first and a second direction perpendicular to each other; an element for transmitting the ultrasound beam toward the object by driving the transducers in a manner that a driving signal having a specified delay time given to focus in the first direction is supplied to at least specified ones of the transducers, the driving signal being supplied simultaneously to each column of transducers disposed in the second direction; an element for receiving the ultrasound echo by processing an echo signal outputted from the at least specified ones of the transducers correspondingly to reception of the ultrasound echo in a manner that for a first imaging mode, the echo signal is not only subjected to control of a specified delay time in the first direction but also received in time sequence and then subjected to control of a specified delay time in the second direction and in a second imaging mode, the echo signal is not only subjected to control of a specified delay time in the first direction but also subjected to simultaneous addition of the echo signal supplied from each transducer residing in each column of the transducers in the second direction; and an element for producing the image using processed echo signal.

For example, the first imaging mode is an imaging mode for acquiring a B-mode image handled as the image and second imaging mode is an imaging mode for acquiring a Doppler image handled as the image.

Preferably, the receiving means comprises a switching means for selectively switching imaging modes between the first and second imaging modes.

A two-dimensional array ultrasonic probe of the present invention has transducers arranged two-dimensionally in a scan direction and in a slice direction orthogonal to the scan direction. Electronically controlling the shape of an ultrasonic beam by introducing delay times to received signals sent from transducers lying in the slice direction, which has been thought impossible in the past, becomes possible. A small beam width can therefore be attained in a relatively wide range in a depth direction. In other words, a high-resolution ultrasonic image can be produced irrespective of depth.

In particular, according to the present invention, B-mode image display that requires especially high resolution can be achieved using a smaller circuit scale or a smaller number of cables by transferring received signals of channels lying in the slice direction on a time-series basis. In particular, in order to acquire high resolution of B-mode images, it is needed to perform beam-forming in the slice direction in addition to the scan direction. By contrast, in Doppler mode in which more emphasis is put on real time than on the shape of an ultrasonic beam, electronic switches are simultaneously brought to conduction. Thus, a conventional method can be selected readily.

DETAILED DESCRIPTION OF THE PREFERRED EMBODIMENTS

Figure 1:
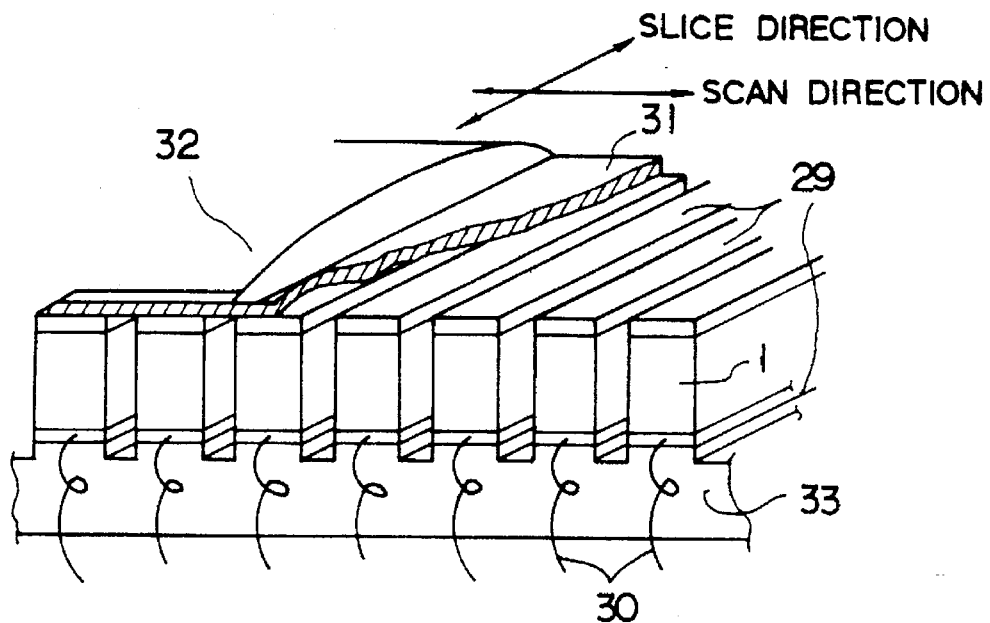
FIG. 1 is a diagram showing a structure of a conventional one-dimensional array probe.
Figure 2:
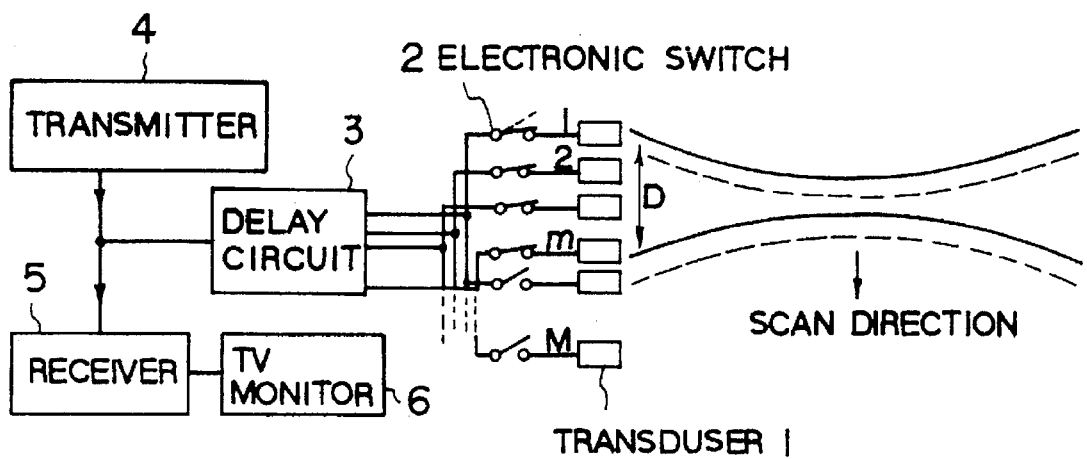
FIG. 2 is a diagram showing the principles of a conventional linear scanning system.
Figure 3:
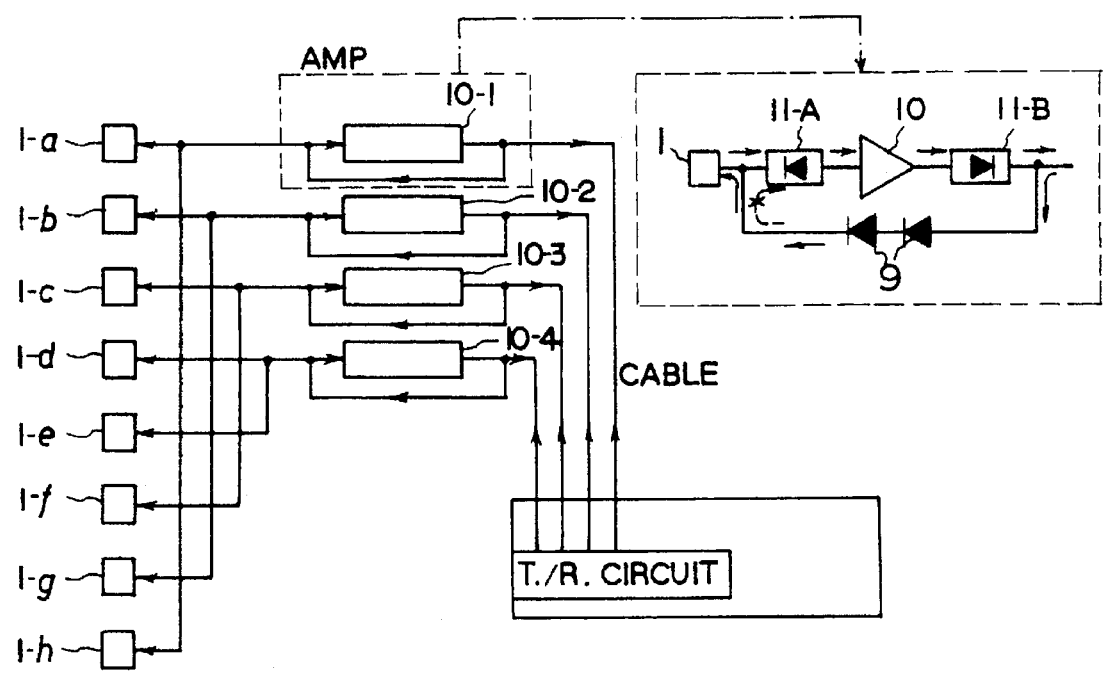
FIG. 3 is a diagram showing a general driving method for a two-dimensional array probe.
Figure 4A:
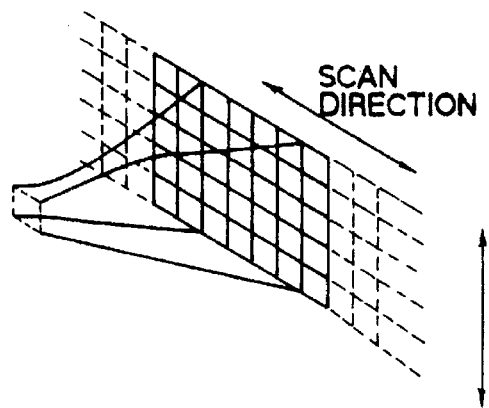
FIGS. 4A to 4D are diagrams showing the principles of beam focusing in the scan and slice directions in the present invention.
Figure 4B:
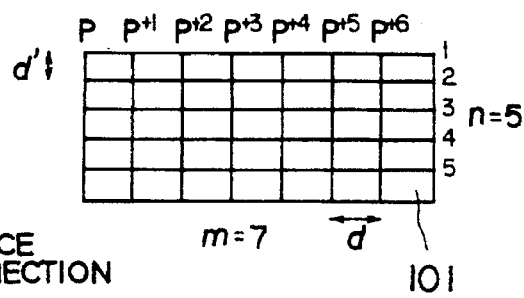

To begin with, as shown in FIGS. 4A and 4B, a description will be made of an arrangement in which seven of transducers 101 (m=7) used for one cycle of transmission and reception of ultrasonic waves are arranged in a scan direction (first direction), and five thereof are arranged in a slice direction (second direction).

Figure 4C:
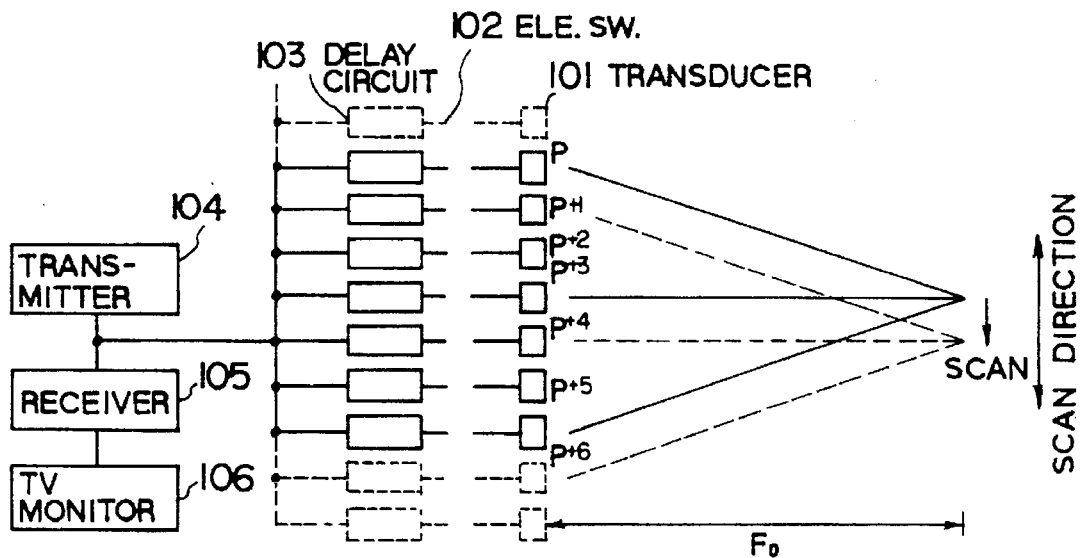

For example, as shown in FIG. 4C, for the p-th scan of linear scanning, when a total of seven transducers p to p+6 lying in the scan direction are involved in transmission or reception of ultrasonic waves by means of electronic switches 102, a delay time ($\tau i$) is introduced into a transmission signal or received signal of the p+i (i ranges from 0 to 6) transducer 101 with a delay time assigned to the p-th and p+6-th transducers 101 by the delay circuit 103 as a reference in order to focus an ultrasonic beam at a forward point Fo. The longest delay time is assigned to the p+3-th transducer 101 lying in the center. The delay time $\tau i$ is expressed as follows:

$$\tau i = d^2\{(m-1)^2 - (2i-m+1)^2\}/8CFo$$

where d denotes a spacing between transducers, C denotes an acoustic velocity inside a living body, and m denotes the number of transducers arranged in the scan direction and used for one cycle of transmission and reception of ultrasonic waves. In this case, m equals to 7.

Figure 4D:
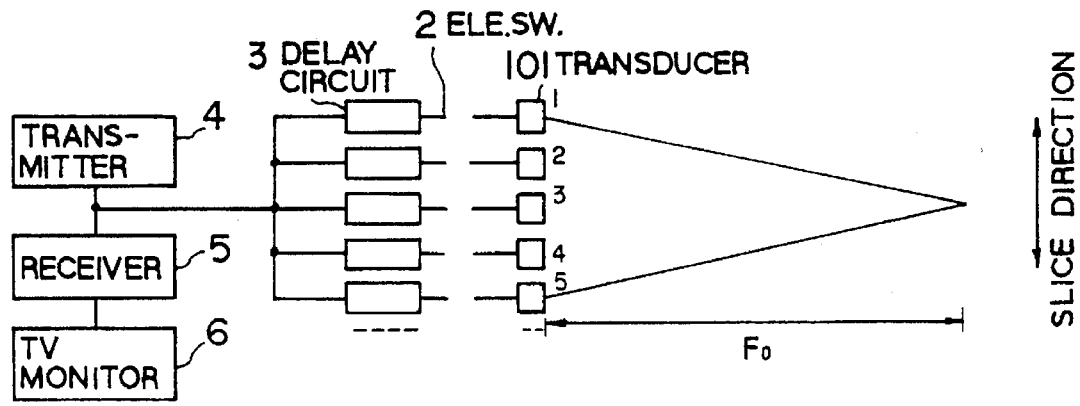

Likewise, as shown in FIG. 4D, a delay time ($\tau q$) is introduced into a transmission signal or received signal of the q-th (q ranges from 1 to n) transducer 101 with a delay time assigned to the first and fifth transducers 101 of n=5 transducers 101 as a reference in order to focus an ultrasonic beam at the forward position Fo in the slice direction. The longest delay time is assigned to the central transducer 101. The delay time $\tau q$ is expressed as follows:

$$\tau q = d'^2\{(n-1)^2 - (2q-n-1)^2\}/8CFo$$

where d' denotes a spacing between transducers on the assumption that the transducers 101 are arranged equidistantly in the slice direction. In practice, as described later, the spacing between transducers lying in the center is usually the largest.

The above description is made of necessary delay times differently between the scan direction and slice direction. In reality, these delay times are set simultaneously. In short, the delay time $\tau(i, n)$ to be introduced to a signal of each transducer lying in the scan direction is expressed as:

$$\tau(i, q) = \tau i + \tau q$$

In describing the constituent features of the present invention, the principles of operations performed relative to the scan direction are identical to those for a one-dimensional array probe.

For reducing the number of cables or the number of receiving circuits in a main unit, the present invention adopts a method of extracting received signals of slice-directional channels from a probe on a time-series basis and transferring the signals by way of a limited number of cables. The method will be described.

In general, it is an ultrasonic tomographic image (so-called B-mode image) that requires the shape of an ultrasonic beam to remain uniform irrespective of a depth and that needs high spatial resolution. This method is therefore adopted mainly for B-mode imaging.

When a Doppler signal is used to calculate a blood flow velocity and analyze the kinetics of a tissue, a method of achieving additive synthesis instantaneously which has been adopted in the past is preferable. In other words, the circuitry must cope with both a time-series received signal extraction method used for B-mode image display and an instantaneous received signal synthesis method used for Doppler mode.

Figure 5:
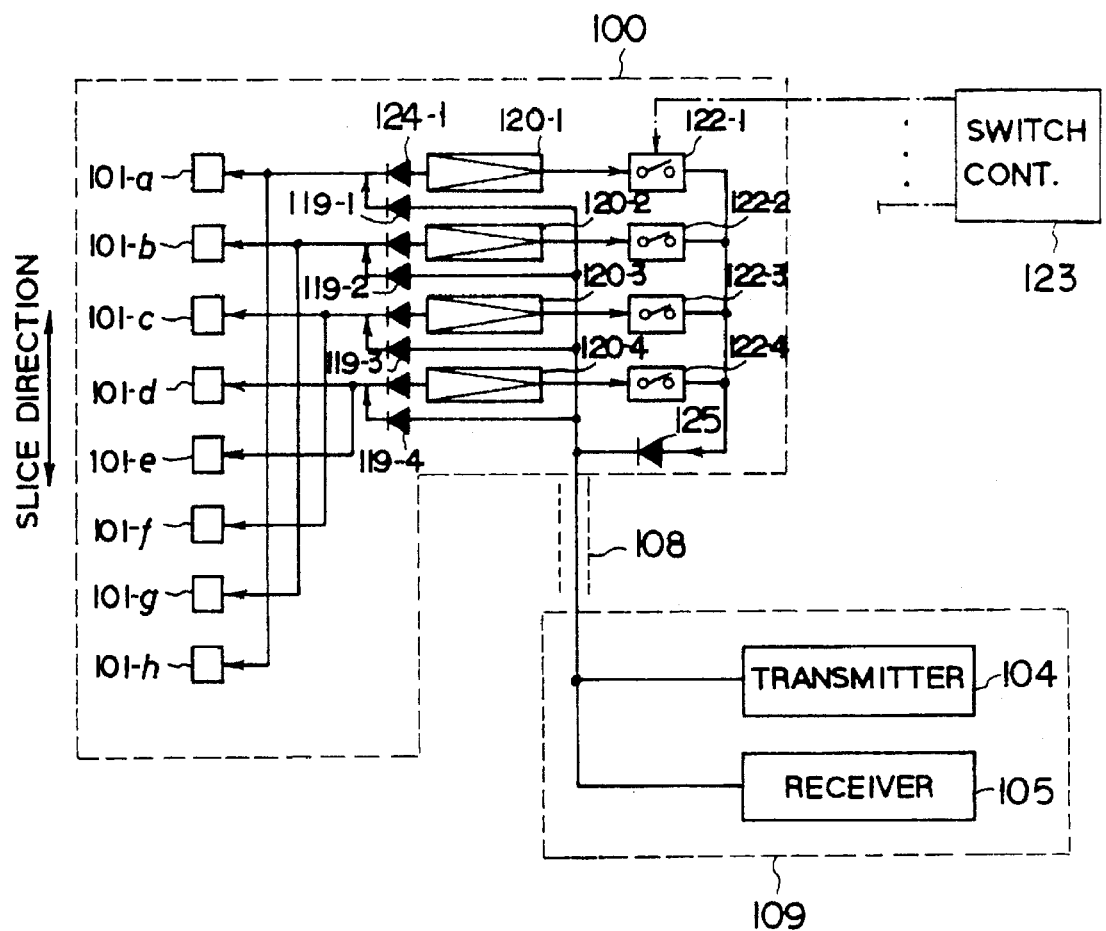
FIG. 5 is a fundamental block diagram for one column of transducers disposed in the slice direction in the first embodiment.

FIG. 5 shows a first embodiment of the present invention, wherein the number of cables 108 linking a probe 100 and a main unit 109 of a system is one as for each column of transducers of a two-dimensional transducer array 111 (refer to FIGS. 4A and 4B). A first transducer driving high-voltage impulse that lags by a given delay time (this delay time is the above delay time $\tau i$ introduced in order to focus an ultrasonic beam in the scan direction) is supplied in common from a transmitter 104 in the main unit 109 to eight transducers 101, which lie in the slice direction within the probe 100, by way of the cable 108. Herein, diodes 119 are placed intermediately.

Since the transducer driving signal is a high voltage, it passes through the diodes 119 and are supplied to transducers 101. The transducers 101 then irradiate ultrasonic waves to a medium (for example, a living body). Reflected ultrasonic waves emanating from the living body are received by the transducers 101, and sent to electronic switches 122 via diodes 124 serving as protection circuits and preamplifiers 120 serving as buffers. The diodes 124 inserted inversely to the signal flow are voltage-biased so that the only echo signal can pass therethrough.

At this time, first, the first electronic switch 122 alone conducts and the others are cut off. Only the received signals of the first transducer 101-a and the eighth transducer 101-h are therefore sent to a buffer memory in a receiver 105 in the main unit 109 by way of a diode 125 serving as a protection circuit and the cable 108, and stored therein temporarily.

Thereafter, a second transducer driving impulse that lags by the same delay time as the previous one is applied to the transducers 101 by the transmitter 104 in exactly the same fashion as the first impulse. At this time, only the signals of the second and seventh transducers 101-b and 101-g are sent to a buffer memory in the main unit 109 via the preamplifiers 120 and the second electronic switch 122 by way of the cable 108, and then stored therein.

Likewise, a driving signal used to drive third and sixth transducers as well as a driving signal used to drive fourth and fifth transducers are applied in order to transmit or receive ultrasonic waves. The received signals of the third and sixth transducers 101-c and 101-f, and those of the fourth and fifth transducers 101-d and 101-e are stored in buffer memories in the main unit 109.

Thereafter, those four kinds of received signals that have been stored are delayed by delay times needed for focusing a beam in the slice direction (aforesaid delay time $\tau q$ where q ranges from 1 to 4) by a delay circuit (in this case, since the received signals are stored in the buffer memories in the form of digital signals resulting from analog-to-digital conversion, a digital delay circuit is preferable). Thus, four signals are acquired on a time-series basis under the same condition for transmission, delayed by given delay times, and then added up for synthesis. The cable 108 can therefore be reduced in number to a quarter of a conventional cable.

However, there is a drawback that this method of signal synthesis takes four times as much time as a method employed in beam formation for conventional scanning. That is to say, this method is signal synthesis to be effected on the assumption that a living body stays substantially at rest during a period during which four cycles of transmission and reception of ultrasonic waves are carried out.

For example, when the heart or an extremely fast motion such as a blood flow is an object of measurement, the time-series method cannot be adopted. For this kind of object of observation making a fast motion, the aforesaid circuitry can readily change the aforesaid time-series signal synthesis to the conventional instantaneous signal synthesis. More particularly, when the first transducer driving pulse is sent simultaneously from the main unit 109 of the system to the transducers 101, if the electronic switches 122 are all brought to conduction, the received signals of the transducers 101 are merely added up for synthesis at the output terminals of the electronic switches 122, and then sent to the receiver 105 in the main unit 109 by way of the cable 108. In this case, the transducers 101 are driven by the same driving signal. The received signals are added up in their entireties without delay time control. The received signals are therefore not divided in time.

Consequently, the same performance as that of the (one-dimensional array) transducers 101 can be ensured. In short, the time-series signal synthesis and instantaneous signal synthesis can be selectively used by changing the operating states of the electronic switches 122. In this method, it is required to install protecting circuits (diodes) 124, 125 at the input terminals of the preamplifiers 120, the output terminals of the electronic switches 2, and the input terminal of the receiver 105 in the main unit 109 for the purpose of preventing the breakdown of any circuit of a reception system due to a high-voltage impulse.

Figure 6:
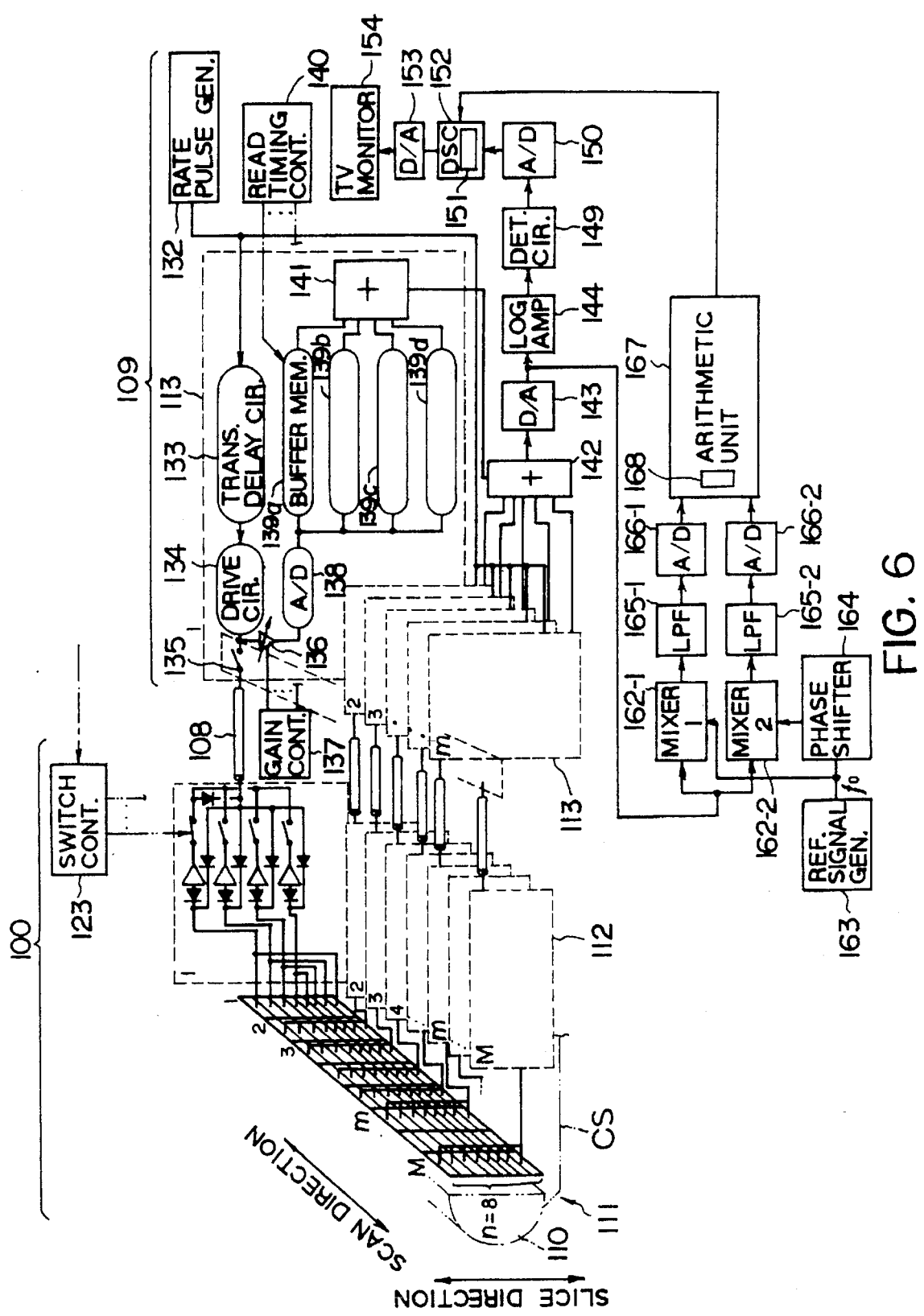
FIG. 6 is a block diagram of an overall system in the first embodiment.

Next, the overall configuration of a diagnostic ultrasound system (linear electronic scanning type) in accordance with the present invention will be described in detail with reference to FIG. 6.

The system comprises, as shown therein, an ultrasound probe 100, a main unit 109, and M-pieces cables 108 connecting the probe 100 to the main unit 109. The probe 100 has a probe casing CS in which various elements are incorporated. Among them are a two-dimensional transducer array 111, probe inner circuits 112 of M-pieces each including the foregoing circuitry shown in FIG. 5, and a switch controller 123. The switch controller 123 is possible to be incorporated in the main unit 109. The probe 100 is also formed with an acoustic lens 110 for focusing an ultrasound beam in the slice direction. (This lens 110 may however be omitted.)

The main unit 109 has, as shown therein, m-pieces (smaller than M-pieces) of transmitting/receiving circuits 113 and other components necessary for producing B-mode tomographic images and/or color Doppler images.

Assume that, as mentioned above, the number of transducer 101 elements arranged in the scan direction in an ultrasonic probe is M, and the number of transducers arranged in the slice direction is n=8. For transmitting ultrasonic waves to a living body (or a medium), first, a rate pulse generator 132 outputs a rate pulse used to determine a repetition rate of an ultrasonic pulse.

The rate pulse is sent to a transmission delay circuit 133 composed of m channels (where m denotes the number of transducers arranged in the scan direction and driven simultaneously), delayed by a delay time (τi) used to determine a focal length of an ultrasonic beam spread in the scan direction during transmission, and then supplied to a drive circuit 134 having m channels. The drive circuit 134 produces driving pulses used to drive ultrasonic transducers 101 for generation of ultrasonic waves. The timing of each driving pulse is determined by an output of the transmission delay circuit 133. The outputs of the drive circuit 134 are supplied by the electronic switches 135 to ultrasonic transducers 101 amounting to a product of m transducers in the scan direction (i-th to i+m−1-th transducers) by 8 transducers in the slice direction from among all the ultrasonic transducers 101 amounting to a product of M transducers in the scan direction by 8 transducers in the slice direction. The ultrasonic transducers 101 are thus driven to generate ultrasonic waves.

The electronic switches 135 are used for desiredly selecting m-pieces of probe inner circuits 112 from M-pieces of them in response to a selection signal supplied from a system controller (not shown).

The ultrasonic waves irradiated to a living body by the ultrasonic transducers 101 are reflected and received again by the ultrasonic transducers 101 (m in the scan direction, 8 in the slice direction) in the ultrasonic probe 100.

In the probe 100, the switch controller 123 is accommodated to control on/off states of each of the electronic switches 122 which are of FETs or transistors, for example. The controller 123 works respondingly to an information signal supplied from a system controller (not shown).

At this time, as already described, electronic switches 122 for switching receiving transducers 101 lying in the slice direction in the probe allow only the signals sent from the first and eighth transducers 101 in the slice direction to enter the transmitting/receiving units 113 in the main unit 109 by way of the signal cable 108. Received signals sent from the first and eighth transducers 101 in the slice direction and acquired through m channels in the scan direction are temporarily stored in a buffer memory 139 via a gain-variable amplifier 136 and an analog-to-digital converting circuit 138 in the transmitting/receiving units 113.

The gain-variable amplifier 136, which functions as a weighting circuitry to the echo signal, intervenes for controlling the size of an aperture formed on the transducer array 111 and/or the depth of a focus of the echoed ultrasound signal. The gain (i.e., weighting coefficient) of the amplifier 136 is adjusted from a gain control signal given from a gain controller 137 also incorporated in the main unit 109.

The rate pulse generator 132 outputs a rate pulse in the same manner as mentioned above. The rate pulse is sent to the transmission delay circuit 133 composed of m channels (m denotes the number of transducers arranged in the scan direction and driven simultaneously), delayed by a delay time (τi where i ranges from 1 to m) used to determine a focal length of an ultrasonic beam spread in the scan direction during transmission, and then supplied to the drive circuit 134 having m channels. The outputs of the drive circuit 134 are supplied by the electronic switches 135 to ultrasonic transducers amounting to a product of m transducers in the scan direction by 8 transducers in the slice direction. The ultrasonic transducers 101 are thus driven to generate ultrasonic waves.

The ultrasonic waves irradiated from the ultrasonic probe to a living body are reflected and received again by the ultrasonic transducers 101 (m in the scan direction, 8 in the slice direction) in the ultrasonic probe 100. At this time, the electronic switches 122 allow only the signals sent from the second and seventh transducers 101 in the slice direction to enter the transmitting/receiving unit 113 in the main unit 109 by way of the signal cable 108. The signals are temporarily stored in a buffer memory 139 via the gain-variable amplifier 138 and the analog-to-digital converting circuit 138 in the transmitting/receiving units 113.

Signals sent from the third and sixth transducers 101 in the slice direction as well as those sent from the fourth and fifth transducers 101 therein are received in the same manner, and then stored in the other buffer memories 139.

The received signals amounting to a product of 4 by m, which have been stored in the memory circuits 139, are delayed by the delay times τ(i, n) (where i ranges from 1 to m and n ranges from 1 to 4) used to focus an ultrasonic beam in the scan direction and slice direction, and then synthesized by an adder 141. This delay control is given by adjusting read-out timing of signal data stored in the memory circuits 139. A read timing controller 140 is placed in the main unit 109, so that such read-out timing is adjusted accordingly to the delay time τ(i, n).

The foregoing gain-variable amplifier 136 may be inserted between the memory circuits 139 and the adder 141.

Furthermore, the synthetic signal is added up by another adder 142 with received signals on the channels lying in the scan direction, converted into an analog signal by a digital-to-analog converter 143, subjected to logarithmic compression and detection by a logarithmic amplifier 144 and envelope detecting circuit 149 respectively, converted into a digital signal again by an A/D converter 150, and then temporarily stored in an image memory 151.

Thereafter, the i+1-th to i+m-th transducers 101 of all the M transducers 101 lying in the scan direction are selected by the electronic switches 135. In this state, the same operation as that mentioned above is carried out.

Furthermore, m transducers 101 such as the i+2-th to i+m+1-th transducers, the i+3-th to i+m+2-th transducers 101, etc. are selected while being shifted one by one. Received signals of the selected transducers 101 are sequentially stored in the image memory 151. Thus, transducers 101 to be operated are changed and a linear scan is executed, whereby an image signal representing one frame image is stored in the image memory 151. The image signal is then converted into a signal conformable to a standard TV format by a DSC (digital scan converter) 152. After converted into an analog form by a D/A converter 153, an ultrasonic B-mode image is displayed on a TV monitor 154. Thus, B-mode images are obtained in a manner that echo signals are preferably beam-formed in both the scan and slice directions.

An output signal of the D/A converter 143 is also sent to two orthogonal phase detecting circuits. Specifically, the signal is first sent to a mixer 162. A reference signal generator 163 feeds a continuous wave having a given frequency (fo) to the mixer 162 with the phase of the continuous wave shifted 90° by a phase shifter 164. An output of the reference signal generator 163 is directly input to the other mixer 162. An output of the mixer 162 has a summation frequency component thereof eliminated by a low-pass filter (LPF) 165, whereby a difference frequency component thereof alone is extracted. The signal having a difference frequency is converted into a digital signal by an A/D converter 166, and then temporarily stored in a memory circuit 168 within an arithmetic unit 167.

For detecting a Doppler signal through calculation, it is required to scan the same region continually and then use a plurality of signals acquired. In this case, the plurality of signals are temporarily stored in the memory 168. At the time when a given number of data items have been stored, an arithmetic unit 167 performs signal analysis on a Doppler signal. Ultrasonic blood flow imaging is a method in which physical quantities such as a center frequency of a spectrum (that is an average value of a flow velocity), a variance of a spectrum (that is a disordered state of flow velocities), and a strength (power) of a Doppler signal are displayed in color and in real time.

Figure 7:
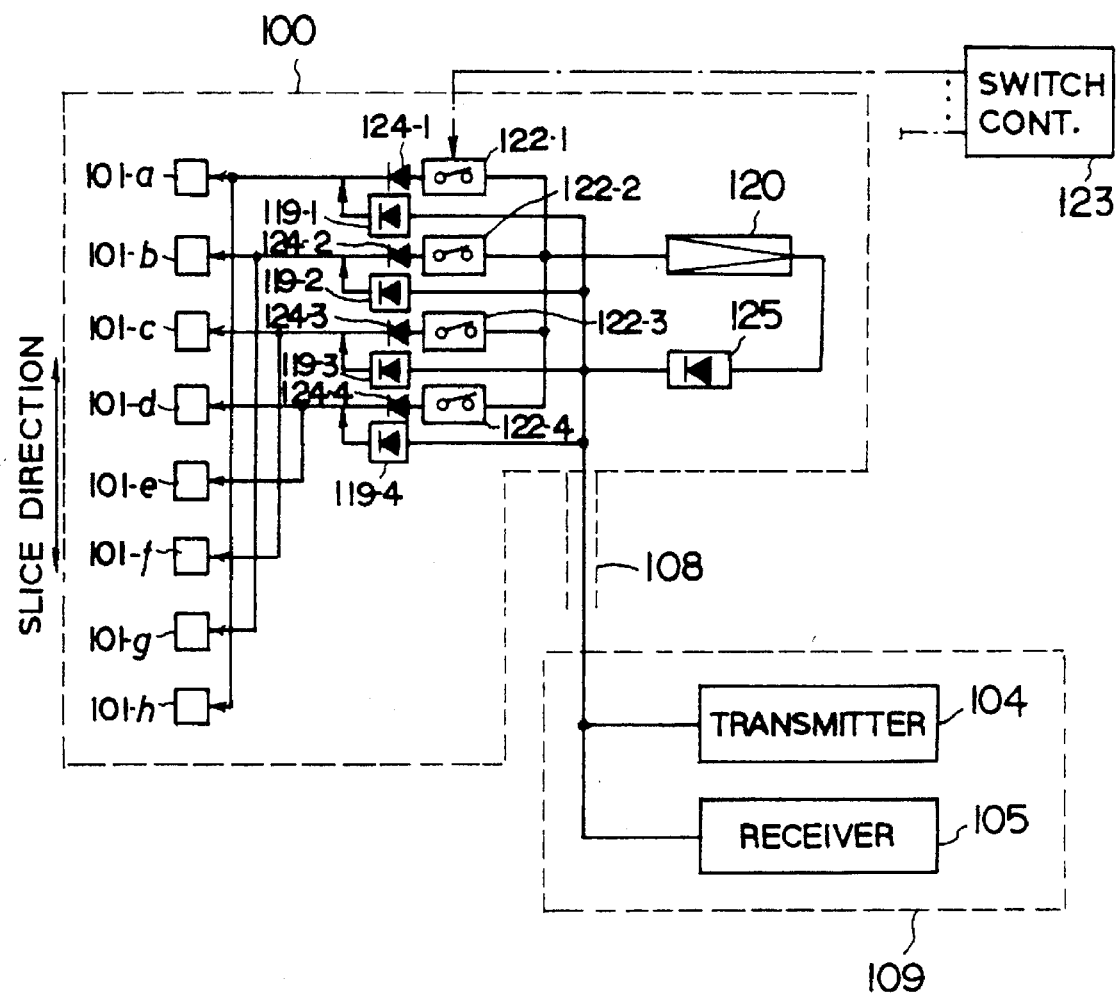
FIG. 7 is a fundamental block diagram for one column of transducers disposed in the slice direction in the second embodiment of the present invention.

FIG. 7 shows the second embodiment of the present invention. According to this method, similarly to the method shown in FIG. 5, one signal line is used for each column of transducers disposed in the slice direction to link a probe 100 with a transmitter 104 and receiver 105 in the main unit 109 of the system. The number of preamplifiers can be decreased by exchanging the positions of electronic switches 122 for that of a preamplifier 120. The operations of circuits in this configuration will be described below.

A first transducer driving high-voltage impulse delayed by a given delay time (this delay time is the delay time $\tau i$ introduced in order to focus an ultrasonic beam in the scan direction) is supplied in common from the transmitter 104 in the main unit 109 to transducers 101 in the probe 100 by way of a cable 108. The transducer driving signal is a high voltage, and therefore passes through diodes 109 interposed between the transducers 101 and transmitter 104. The driving signal is then supplied to the transducers 101.

The transducers 101 then irradiate ultrasonic waves to a medium (for example, a living body). Ultrasonic waves reflected from the living body are received by the transducers 101. Only the signals sent from the first and eighth transducers 101 of all the transducers 101 are sent to the preamplifier 120 via a first electronic switch 122. At this time, the other second to fourth electronic switches 122 are nonconducting. Specifically, only the received signals of the first and eighth transducers 101 are sent to a buffer memory in the receiver 105 in the main unit 109 via the preamplifier 120 by way of the cable 108, and temporarily stored in the buffer memory.

Thereafter, another transducer driving impulse delayed by the same delay time as the previous one is applied to the transducers 101 in the same manner as the first impulse. Only the received signals of the second and seventh transducers 101 of all the received signals pass through a second electronic switch 122, are sent to the same preamplifier 120 as the previous one, and then stored in another buffer memory in the main unit 109 by way of the signal.

Likewise, the third and fourth transducer driving signals are applied to transmit and receive ultrasonic waves by the third and sixth transducers and the fourth and fifth transducers respectively. The received signals are stored in other buffer memories in the main unit 109.

Thereafter, the four kinds of received signals are delayed by delay times (the delay times $\tau q$) needed to focus a beam in the slice direction by means of a delay circuit, and then added up for synthesis. Even in this case, four signals are acquired on a time-series basis under the same condition for transmission, and then added up for synthesis. The cable 108 can therefore be reduced in number to a quarter of a conventional cable.

When the heart or an extremely fast motion such as a blood flow is an object of measurement, the time-series signal synthesis can be readily changed into the instantaneous signal synthesis. Specifically, when the first transducer driving pulse is sent to the transducers 101 from the main unit 109 of the system, if the electronic switches 122 are all conducting, the received signals of the transducers 101 are simply added up for synthesis at the input terminal of the preamplifier 120, and then sent to the receiver 105 in the main unit 109 via the preamplifier 120 by way of the cable 108.

Even in this case, the transducers 101 are driven by the same driving signal, and the received signals are added up in their entireties without delay time control. The received signals are therefore not divided in time. Consequently, the same performance as that provided by the (one-dimensional array) transducers 101 can be ensured. In short, the time-series signal synthesis and instantaneous signal synthesis can be used selectively by changing the operating states of the electronic switches 122.

Incidentally, according to this method, it is required to install protecting circuits 124,125 at the output terminal of the preamplifier 120, the input terminals of the electronic switches, and the input terminal (not shown) of the receiver 105 in the main unit 109 for the purpose of preventing the breakdown of any circuit of the receiving system due to a high-voltage impulse of a driving signal.

Figure 8:
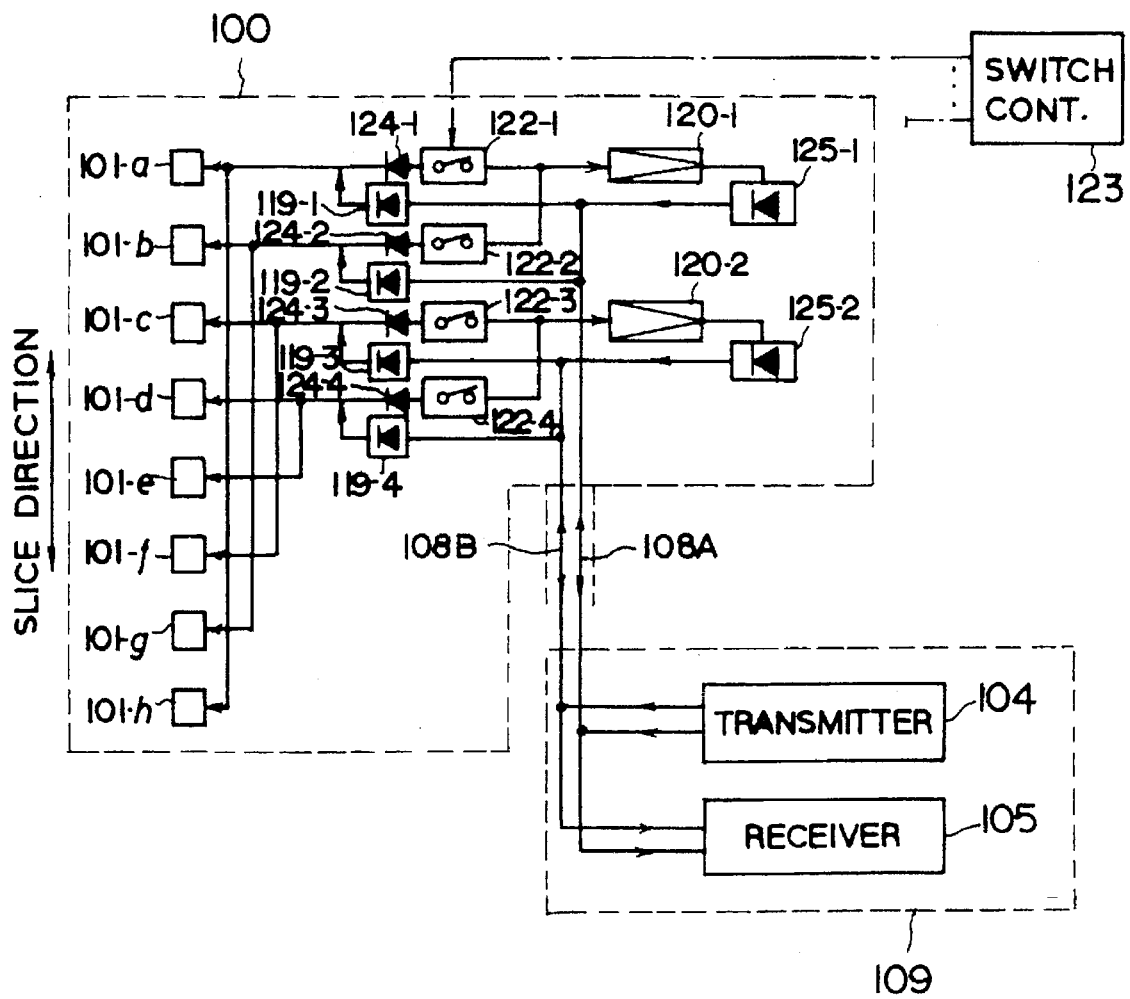
FIG. 8 is a fundamental block diagram for one column of transducers disposed in the slice direction in the third embodiment of the present invention.

FIG. 8 shows the third embodiment of the present invention.

In the first and second embodiments, only one cable is used for one Column of transducers disposed in the slice direction. When the number of cables is decreased, the circuitry is simplified. However, transmission and reception of ultrasonic waves must be carried out a plurality of times in order to acquire one received signal. As already described, this method cannot therefore be adapted for an organ making a quick motion. Moreover, since the number of frames constituting an image increases, the maneuverability of the probe deteriorates. FIG. 8 shows the configuration in which this problem is modified. The number of signal cables is two and the frequency of time-series signal addition is two. The principles of operations of circuits in this configuration will be described below.

First transducer driving high-voltage impulses A and B that are delayed by two kinds of given delay times (the delay times are delay times $\tau(i, 12)$ and $\tau(i, 34)$ which are calculated by adding the delay time $\tau i$ introduced in order to focus an ultrasonic beam in the scan direction to delay times $\tau 12$ and $\tau 34$ needed to focus the ultrasonic beam in the slice direction) are supplied from a transmitter 104 in the main unit 109 to first, second, seventh, and eighth transducers 101 in a probe 100 and third, fourth, fifth, and sixth transducers 101 therein by ways of two cables 108A and 108B. Herein, $\tau(i, 12)=\tau i+\tau 12$ and $\tau(i, 34)=\tau i+\tau 34$ are established. The delay times needed to focus a beam in the slice direction during transmission, $\tau 12$ and $\tau 34$ may generally be defined as $(\tau 1+\tau 2)/2$ and $(\tau 3+\tau 4)/2$ respectively.

However, the present invention is not limited to this definition. During transmission, the transducer driving signals are supplied to the transducers 101 after passing through diodes 109. The transducers 101 duly irradiate ultrasonic waves to a medium. Ultrasonic waves reflected from a living body are received by the transducers 101. At this time, first and third electronic switches 122-1 and 122-3 are brought to conduction, and second and fourth electronic switches 122-2 and 122-4 are brought to nonconduction. Consequently, the signals of the first and eighth transducers 101-$a$ and 101-$h$ are acquired via the first electronic switch 122-1 and a first preamplifier 120-1, and then temporarily stored in a buffer memory in the main unit 109 of the system via a first protecting circuit 125-1 byway of the first cable 108A.

By contrast, the signals of the third and sixth transducers 101-c and 101-f are acquired via the third electronic switch 122-3 and a second preamplifier 120-2, and temporarily stored in another buffer memory in the main unit 109 of the system via a second protecting circuit 125-2 by way of the second cable 108B. At this time, the received signals of the second and seventh transducers 101-b and 101-g and those of the fourth and fifth transducers 101-d and 101-e are cut off by a second electronic switch 122-2 and a fourth electronic switch 122-4, and therefore not transferred to the main unit 109 of the system.

Thereafter, the transmitter 104 in the main unit 109 supplies second transducer driving high-voltage impulses, which are delayed by the same two kinds of delay times ($\tau(i, 12)$ and $\tau(i, 34)$) as the previous ones, to the first, second, seventh, and eighth transducers 101-a, 101-b, 101-g, and 101-h, and the third, fourth, fifth, and sixth transducers 101-c, 101-d, 101-e, and 101-f respectively via first, second, third, and fourth diodes 119-1 to 119-4 by way of the two cables 108A and 108B.

Ultrasonic waves reflected from the living body are received by the transducers 101. At this time, the second and fourth electronic switches 122-2 and 122-4 are brought to conduction, and the first and third electronic switches 122-1 and 122-3 are brought to nonconduction.

Consequently, the signals of the second and seventh transducers 101-b and 101-g are acquired via the second electronic switch 122-2 and first preamplifier 120-1, and then temporarily stored in another buffer memory in the main unit 109 of the system via the first protecting circuit 125-1 by way of the first cable 108A. The signals of the fourth and fifth transducers 101-d and 101-e are acquired via the fourth electronic switch 122-4 and second preamplifier 120-2, and temporarily stored in another buffer memory in the main unit 109. At this time, the received signals of the first and eighth transducers 101-a and 101-h and the third and sixth transducers 101-c and 101-f are cut off by the first electronic switch 122-1 and third electronic switch 122-3, and therefore not transferred to the main unit 109.

Owing to this configuration, while ultrasonic waves are being transmitted to the same region twice under the same conditions, received signals (S1 to S4) are acquired from the transducers 101 and stored in the memory circuit in the main unit 109.

Figure 9:
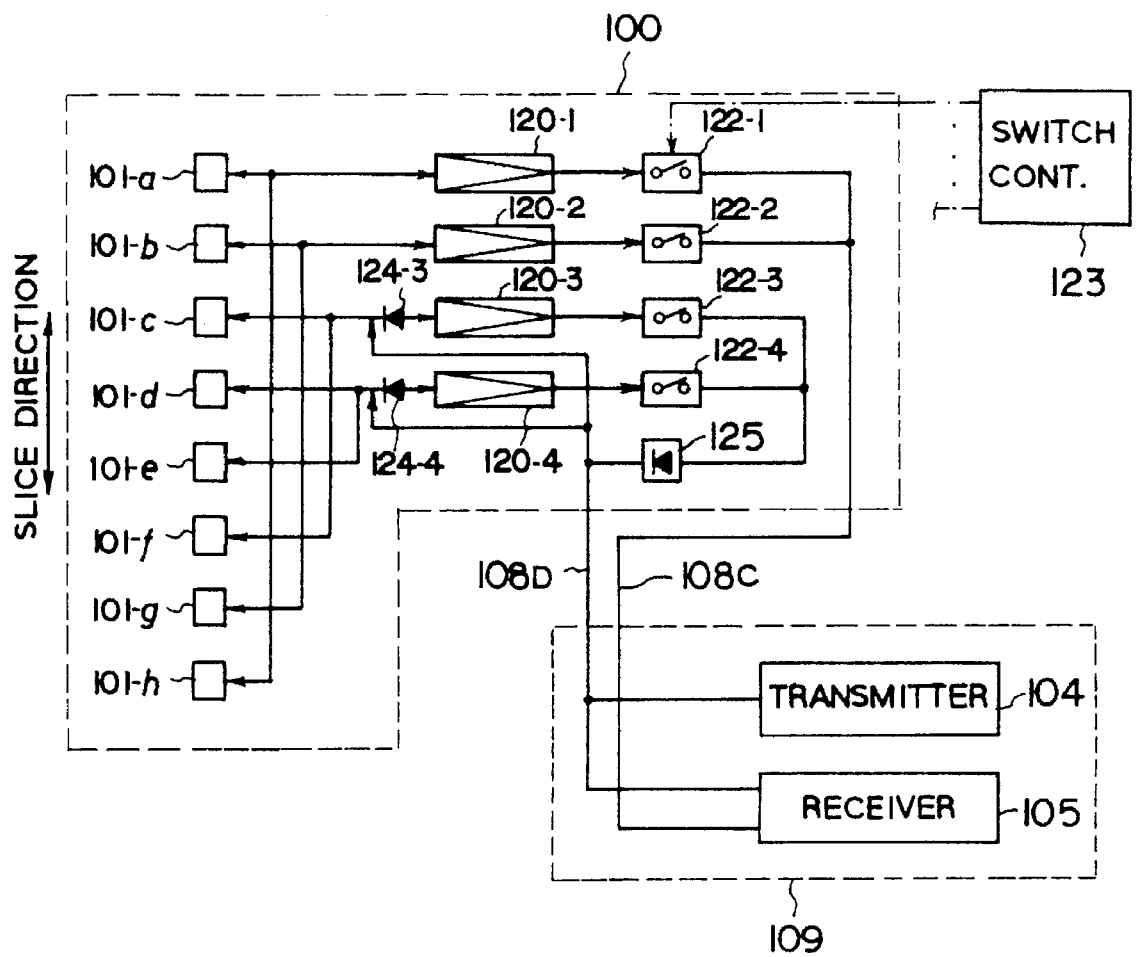
FIG. 9 is a fundamental block diagram for one column of transducers disposed in the slice direction in the fourth embodiment of the present invention.
Figure 10:
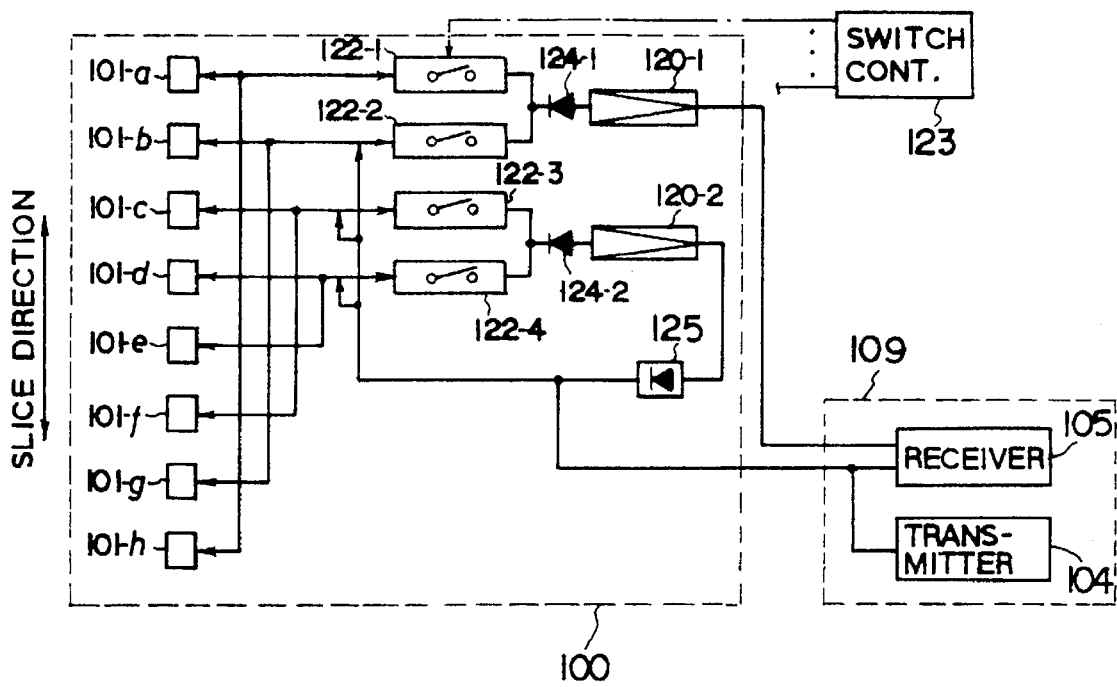
FIG. 10 is a fundamental block diagram for one column of transducers disposed in the slice direction in the fifth embodiment of the present invention.

In the above embodiments, the number of transducers arranged in the slice direction and used for transmission and the number of transducers used for reception are n. However, the present invention is not limited to this mode. It is often more preferable that for example, as shown in FIGS. 9 and 10, the number of transducers used for transmission is smaller than the number of transducers used for reception. This is because since it cannot be helped fixing a focal point to one position, when an ultrasonic beam is forcibly focused on a given particular spot, it becomes hard to keep the beam shape uniform throughout transmission and reception.

The present invention has been described in conjunction with embodiments in which focusing a beam (beam-forming) in the slice direction is achieved by a combination of an acoustic lens and an electronic method (that is, delay time control). In this case, a sum of delays of sound waves caused by the acoustic lens and delays caused by the delay circuit determines a focal point. The present invention is not limited to this method. Alternatively, the electronic method alone may be used.

The movement of a focal point can be carried out quickly by electronically controlling the delay times introduced by the delay circuit. The aforesaid embodiments have been described by taking the linear electronic scanning for instance. The present invention is not limited to this scanning technique. Alternatively, needless to say, the present invention will be effectively adapted for, for example, the sector scanning or convex scanning.

According to the present invention, an electronic scanning type two-dimensional array probe making it possible to attain a uniform beam width even in the slice direction can be realized relatively easily. Clear tomographic images (B-mode images) can be produced. Moreover, for measurement using a Doppler signal or imaging which is conventionally performed, it is possible to select a scanning technique similar to the one conventionally adopted.

What is claimed is:

1. A diagnostic ultrasound system by which an ultrasound beam is scanned within an object to be examined to receive an ultrasound echo produced by reflection of the ultrasound beam, the ultrasound echo being processed into an image of the object, the system comprising:

an ultrasound probe having a two-dimensional array of transducers in which a plurality of transducers are two-dimensionally disposed in both a first and a second direction perpendicular to each other;

means for transmitting the ultrasound beam toward the object by driving the transducers in a manner that a driving signal having a specified delay time given to focus in the first direction is supplied to at least specified ones of the transducers, the driving signal being supplied almost simultaneously to each column of transducers disposed in the second direction;

means for receiving the ultrasound echo by processing an echo signal outputted from the at least specified ones of the transducers correspondingly to reception of the ultrasound echo in a manner that the echo signal is not only subjected to control of a specified delay time in the first direction but also received in time sequence and then subjected to control of at least one of a specified delay time and a specified weighting factor in the second direction; and means for producing the ultrasound image using the processed echo signal.

2. The diagnostic ultrasound system of claim 1, wherein said first direction is a scan direction of the ultrasound beam and said second direction is a slice direction sliced by the ultrasound beam.

3. The diagnostic ultrasound system of claim 2, wherein said ultrasound probe is formed with an acoustic lens through which the ultrasound beam and the ultrasound echo are transmitted from and to the transducers and are beam-formed in the slice direction.

4. The diagnostic ultrasound system of claim 2, wherein said receiving means comprises a weighting circuitry for applying the weighting coefficient to the echo signal according to an aperture control of the two-dimensional array.

5. The diagnostic ultrasound system of claim 2, wherein said transmitting means includes a transmission circuit for supplying the driving signal in common to each column of the transducers disposed in the slice direction.

6. The diagnostic ultrasound system of claim 5, wherein said transmission circuit includes, for each column of the transducers disposed in the slice direction, a transmission branch circuit connected to each transducer residing in each column of the transducers, a signal line of which one end is connected to the branch circuit, and a driving circuit connected to the other end of the signal line.

7. The diagnostic ultrasound system of claim 6, wherein said driving circuit includes an element providing the driving signal the specified delay time given to the scan in the scan direction.

8. The diagnostic ultrasound system of claim 6, wherein said receiving means includes a reception circuit for receiving the echo signal in a selective manner of every transducer residing in each column of the transducers disposed in the slice direction.

9. The diagnostic ultrasound system of claim 8, wherein said reception circuit includes, for each column of the transducers disposed in the slice direction, a reception branch circuit connected to each transducer residing in each column of the transducers, a signal line of which one end is connected to the branch circuit, and a signal processing circuit connected to the other end of the signal line.

10. The diagnostic ultrasound system of claim 9, wherein said transducers disposed in the second direction are even in number and each pair of the transducers disposed in each column of the array are electrically connected to each other and arranged in parallel with a combination of each of the transmission circuits and each of the reception circuit, each pair of the transducers consisting of two transducers symmetrically positioned with regard to a center in the slice direction of the array.

11. The diagnostic ultrasound system of claim 9, wherein in each of said transmission circuits, the transmission branch circuit is divided into two each of which is connected to the signal line and in each of said reception circuits, the reception branch circuit is connected to the signal line used in common with the transmission branch circuit.

12. The diagnostic ultrasound system of claim 9, wherein in each of said transmission circuits, the transmission branch circuit is connected with only partial transducers residing in each column of the transducers and in each of said reception circuits, the reception branch circuit is connected with all the transducers residing in each column of the transducers.

13. The diagnostic ultrasound system of claim 9, wherein said signal line of the transmission circuit and said signal line of the reception circuit are made up of one signal cable used in common.

14. The diagnostic ultrasound system of claim 13, wherein main circuit-side channels each comprising the driving circuit and the signal processing circuit are less in number than probe-side circuit channels each comprising the transmission branch circuit and the reception branch circuit and wherein said receiving means comprises a selecting switch means for selectively connecting each of the main-side circuit channels to the probe-side circuit channels.

15. The diagnostic ultrasound system of claim 9, wherein said reception branch circuit is incorporated together with said two-dimensional array of transducers within a probe case of the ultrasound probe.

16. The diagnostic ultrasound system of claim 15, wherein said reception branch circuit has a single buffer amplifier passing the echo signal supplied from each transducer residing in each column of the transducers, electrical switching elements each responsively switched on/off by a switch control signal, each of the electrical switching elements being placed before the buffer amplifier and in each branch path from each transducer to the buffer amplifier, and a control element supplying the switch control signal to the electrical switching elements, the switch control signal time-sequentially and selectively controlling on and off states of each of the electrical switching elements.

17. The diagnostic ultrasound system of claim 15, wherein said reception branch circuit has buffer amplifiers passing the echo signal supplied from each transducer residing in each column of the transducers.

18. The diagnostic ultrasound system of claim 17, wherein said reception branch circuit further has electrical switching elements each responsively switched on/off by a switch control signal and a control element supplying the switch control signal to the electrical switching elements, the switch control signal time-sequentially and selectively controlling on and off states of each of the electrical switching elements.

19. The diagnostic ultrasound system of claim 18, wherein each of said electrical switching elements are placed after each of said buffer amplifiers.

20. The diagnostic ultrasound system of claim 19, wherein a diode is placed before each of the buffer amplifiers for interrupting a high-voltage impulse used as the driving signal and another diode is placed, after the electrical switching elements, in a common path of the reception branch circuit.

21. The diagnostic ultrasound system of claim 17, wherein said signal processing circuit comprises an element for electrically delaying the echo signal in accordance with the specified delay time assigned to the slice direction.

22. The diagnostic ultrasound system of claim 21, wherein said electrical delaying element comprises a memory element time-sequentially storing digital data of the echo signal over a certain times of drive for each column of the transducers, an element for reading out the digital data from the memory element with the specified delay time assigned to the slice direction, and an element for adding the read-out data to each other.

23. The diagnostic ultrasound system of claim 22, wherein said signal processing circuit further comprises another element for adding up data outputted from all the adding elements each of which is assigned to each column of the transducers.

24. A diagnostic ultrasound system by which an ultrasound beam is scanned within an object to be examined to receive an ultrasound echo produced by reflection of the ultrasound beam, the ultrasound echo being processed into an image of the object, the system comprising:

an ultrasound probe having a two-dimensional array of transducers in which a plurality of transducers are two-dimensionally disposed in both a first and a second direction perpendicular to each other;

means for transmitting the ultrasound beam toward the object by driving the transducers in a manner that a driving signal having a specified delay time given to focus in the first direction is supplied to at least specified ones of the transducers, the driving signal being supplied simultaneously to each column of transducers disposed in the second direction;

means for receiving the ultrasound echo by processing an echo signal outputted from the at least specified ones of the transducers correspondingly to reception of the ultrasound echo in a manner that for a first imaging mode, the echo signal is not only subjected to control of a specified delay time in the first direction but also received in time sequence and then subjected to control of a specified delay time in the second direction and in a second imaging mode, the echo signal is not only subjected to control of a specified delay time in the first direction but also subjected to simultaneous addition of the echo signal supplied from each transducer residing in each column of the transducers in the second direction; and means for producing the image using processed echo signal.

25. The diagnostic ultrasound system of claim 24, wherein said first imaging mode is an imaging mode for acquiring a B-mode image handled as the image and second imaging mode is an imaging mode for acquiring a Doppler image handled as the image.

26. The diagnostic ultrasound system of claim 25, wherein said receiving means comprises a switching means for selectively switching imaging modes between the first and second imaging modes.

27. The diagnostic ultrasound system of claim 24, wherein said transmitting means includes a transmission circuit for supplying the driving signal in common to each column of the transducers disposed in the second direction.

* * * * *